(12) United States Patent
van Peer et al.

(10) Patent No.: US 9,061,480 B2
(45) Date of Patent: Jun. 23, 2015

(54) PLASTIC LAMINATES AND METHODS FOR MAKING THE SAME

(75) Inventors: Cornelis Johannes Gerardus Maria van Peer, Bergen op Zoom (NL); Gert Boven, Steenbergen (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 1655 days.

(21) Appl. No.: 11/684,082

(22) Filed: Mar. 9, 2007

(65) Prior Publication Data

US 2008/0216940 A1  Sep. 11, 2008

(51) Int. Cl.
| | |
|---|---|
| B32B 7/12 | (2006.01) |
| B32B 17/10 | (2006.01) |
| B32B 25/20 | (2006.01) |

(52) U.S. Cl.
CPC ............ *B32B 7/12* (2013.01); *B32B 17/10018* (2013.01); *B32B 17/10697* (2013.01); *B32B 17/10908* (2013.01); *B32B 25/20* (2013.01); *B32B 2369/00* (2013.01); *B32B 2605/00* (2013.01)

(58) Field of Classification Search
None
See application file for complete search history.

(56) References Cited

U.S. PATENT DOCUMENTS

| | | |
|---|---|---|
| 2,999,835 A | 9/1961 | Goldberg |
| 3,153,008 A | 10/1964 | Fox |
| 3,160,551 A | 12/1964 | Buetow et al. |
| 3,334,154 A | 8/1967 | Kim |
| 3,388,035 A | 6/1968 | Mattimoe et al. |
| 3,616,839 A | 11/1971 | Burrin et al. |
| 3,764,457 A | 10/1973 | Chang et al. |
| 4,001,184 A | 1/1977 | Scott |
| 4,121,014 A | 10/1978 | Shaffer |
| 4,123,436 A | 10/1978 | Holub et al. |
| 4,131,575 A | 12/1978 | Adelmann et al. |
| 4,305,982 A | 12/1981 | Hirsch |
| 4,351,920 A | 9/1982 | Ariga et al. |

(Continued)

FOREIGN PATENT DOCUMENTS

| | | |
|---|---|---|
| DE | 2239404 A1 | 2/1974 |
| EP | 0389291 B1 | 9/1990 |

(Continued)

OTHER PUBLICATIONS

French Patent No. 2634417 A1; Publication Date: Jan. 26, 1990; Abstract Only; 1 page.

(Continued)

*Primary Examiner* — Callie Shosho
*Assistant Examiner* — Nicholas Kokkinos
(74) *Attorney, Agent, or Firm* — Cantor Colburn LLP

(57) ABSTRACT

In one embodiment, a laminate comprises: a plastic sheet, a second sheet, an adhesive disposed between and in physical contact with the plastic sheet and the second sheet, and an interlayer formed from a liquid filling having a viscosity that does not form bubbles visible to the unaided eye. The laminate has a storage modulus that varies by a factor less than or equal to about 200 at 1 Hz in the temperature range of −40° C. to 200° C. In another embodiment, a laminate comprises: a plastic sheet, a second sheet, an adhesive disposed between and in physical contact with the plastic sheet and the second sheet, and an elastomer interlayer formed from a liquid RTV filling. In one embodiment, a method for making a laminate comprises: adhering a glass sheet to a plastic sheet with an adhesive to form a gap therebetween, and introducing a liquid RTV filling to the gap.

23 Claims, 2 Drawing Sheets

(56) References Cited

U.S. PATENT DOCUMENTS

| | | | |
|---|---|---|---|
| 4,774,143 A * | 9/1988 | Gondela et al. | 428/442 |
| 4,908,083 A | 3/1990 | Hall | |
| 4,914,143 A | 4/1990 | Patel | |
| 5,019,443 A | 5/1991 | Hall | |
| 5,103,336 A | 4/1992 | Sieloff | |
| 5,262,475 A | 11/1993 | Creasy | |
| 5,286,537 A | 2/1994 | Oita et al. | |
| 5,312,672 A * | 5/1994 | Dittmeier et al. | 428/192 |
| 5,318,850 A | 6/1994 | Pickett et al. | |
| 5,449,560 A | 9/1995 | Antheunis et al. | |
| 5,501,910 A | 3/1996 | Smith | |
| 5,589,272 A | 12/1996 | Braun et al. | |
| 6,159,110 A | 12/2000 | Sullivan et al. | |
| 6,287,674 B1 | 9/2001 | Verlinden et al. | |
| 6,506,487 B2 | 1/2003 | Nagai | |
| 6,709,750 B1 | 3/2004 | Pohlmann et al. | |

FOREIGN PATENT DOCUMENTS

| | | |
|---|---|---|
| EP | 1024952 B1 | 6/2002 |
| EP | 1345764 B1 | 9/2003 |
| FR | 2634417 A | 1/1990 |
| WO | 2006/057771 A2 | 6/2006 |

OTHER PUBLICATIONS

International Search Report; International Application No. PCT/IB2008/000920; International Filing Date: Mar. 10, 2008; Date of Mailing: Sep. 10, 2008; 6 pages.

Written Opinion of the International Searching Authority; International Application No. PCT/IB2008/000920; International Filing Date: Mar. 10, 2008; Date of Mailing: Sep. 10, 2008; 8 pages.

* cited by examiner

PLASTIC LAMINATES AND METHODS FOR MAKING THE SAME

BACKGROUND

The present disclosure relates generally to plastic (sheet) laminates, and more specifically to a plastic and glass laminate with a filling therebetween.

Glass laminated products have contributed to society for almost a century. Beyond the well known, every day automotive safety glass used in windshields, glass laminates are used in most forms of the transportation industry. They are utilized as windows for trains, airplanes, ships, and nearly every other mode of transportation. Safety glass is characterized by high impact and penetration resistance and does not scatter glass shards and debris when shattered. Glass laminates find widespread use in architectural applications, as well.

A glass laminate typically consists of a sandwich of two glass sheets or panels bonded together with an interlayer of a polymeric film or sheet which is placed between the two glass sheets. One or both of the glass sheets may be replaced with optically clear rigid polymeric sheets such as, for example, sheets of polycarbonate materials. Glass laminates have further evolved to include multiple layers of glass and/or polymeric sheets bonded together with interlayers of polymeric films or sheets.

Although the glass-plastic laminate has the advantage of a reduced weight compared to a glass-glass laminate, the glass-plastic laminate can be stressed during thermal cycles and as a result has issues such as curvature and/of cracking over time. Hence there is a continual need for glass-plastic laminates with reduced stress built-up during thermal cycles and enhanced resistance to cracking.

BRIEF SUMMARY

Disclosed herein are laminates and methods of making the same.

In one embodiment, a laminate comprises: a plastic sheet, a second sheet, an adhesive disposed between and in physical contact with the plastic sheet and the second sheet, and an interlayer. The interlayer is formed from a liquid filling having a viscosity that does not form bubbles visible to the unaided eye. The laminate has a storage modulus that varies by a factor of less than or equal to about 200 at 1 Hz in the temperature range of −40° C. to 200° C.

In another embodiment, a laminate comprises: a plastic sheet, a second sheet, an adhesive disposed between and in physical contact with the plastic sheet and the second sheet, and an elastomer interlayer formed from a liquid RTV filling. The second sheet can comprise plastic and/or glass.

In yet another embodiment, a laminate comprises: a thermoplastic sheet, a glass sheet, acrylic foam disposed between and in physical contact with the plastic sheet and the glass sheet, and an elastomer interlayer formed from a silicone RTV filling.

In one embodiment, a method for making a laminate comprises: adhering a glass sheet to a plastic sheet with an adhesive to form a gap between the glass sheet and the plastic sheet, and introducing a liquid RTV filling to the gap.

The above described and other features are exemplified by the following figures and detailed description.

BRIEF DESCRIPTION OF THE DRAWINGS

Refer now to the figures, which are graphical comparisons based upon exemplary embodiments set forth in the Examples.

DETAILED DESCRIPTION

Figure 1:
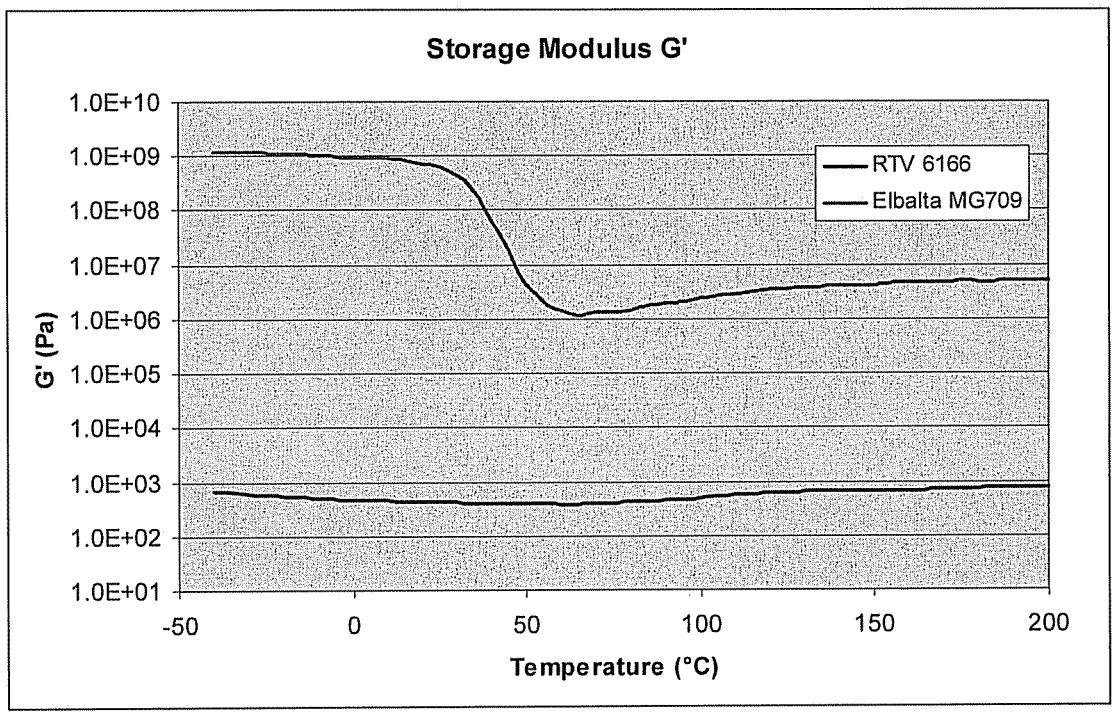
FIG. 1 is a graphical representation of storage modulus, G', versus temperature.

It has been discovered that, over time, glass, in a glass-plastic laminate, tends to form cracks that impair visibility through the laminate, reduce the structural integrity of the laminate. It has been discovered that polyurethane adhesive films can be employed between glass and plastic to form a laminate. However, the cost of the polyurethane adhesive film, as well as the autoclave process used to form the glass/polyurethane adhesive film/plastic laminate, are cost prohibitive for many applications.

Disclosed herein are plastic-plastic and glass-plastic laminates and methods of making the same. These laminates comprise an elastomer layer between the laminate sheets (e.g., glass and plastic, or plastic and plastic) as well as an adhesive around the periphery of the elastomer, between the laminate sheets. Not to be limited by theory, due to elastomer, which is formed from a room temperature vulcanized liquid, the difference in the coefficient of thermal expansion of one sheet (e.g., of the glass sheet) versus that of the other sheet (e.g., a plastic sheet), is compensated. As a result, even with thermal cycling (e.g., due to environmental conditions such as season changes, a difference in temperature on one side of the laminate versus the other side, etc.) cracking of the sheet(s) (e.g., the glass sheet) is reduced or eliminated. Additionally, with the use of the adhesive (e.g., as a sort of frame around the elastomer), delamination of the sheets is reduced as compared to laminates with curable liquid polyurethane between the sheets.

In one embodiment, the laminate can comprise: a plastic sheet, a second sheet, an adhesive disposed between and in physical contact with the plastic sheet and the second sheet, and an interlayer. The interlayer is formed from a liquid filling having a viscosity that does not form bubbles visible to the unaided eye. The laminate has a storage modulus that varies by a factor of less than or equal to about 200 at 1 Hz in the temperature range of 40° C. to 200° C. The viscosity can be less than or equal to about 1,500 cPs. The storage modulus can vary by a factor of less than or equal to about 100, and the loss modulus can vary by a factor of less than or equal to about 500, or, more specifically, can vary by a factor of less than or equal to about 100. The liquid filling comprises silicone RTV. The adhesive comprises an acrylic foam tape. The plastic sheet can comprise a transparent thermoplastic. In some embodiments the liquid filling can comprise silicone RTV, the adhesive can comprise acrylic foam, and the plastic sheet can comprise polycarbonate.

In another embodiment, the laminate can comprise: a plastic sheet, a second sheet, an adhesive disposed between and in physical contact with the plastic sheet and the second sheet, and an elastomer interlayer formed from a liquid RTV filling. The second sheet can comprise plastic and/or glass.

In yet another embodiment, the laminate comprises: a thermoplastic sheet, a glass sheet, acrylic foam disposed between and in physical contact with the plastic sheet and the glass sheet, and an elastomer interlayer formed from a silicone RTV filling.

The glass can be any glass type, e.g. soda-lime, borosilicate (e.g., Pyrex borosilicate, sodium borosilicate, etc.), E-glass, S-glass, and so forth, as well as combinations comprising at least one of the foregoing. The glass should have a sufficient thickness to provide structural integrity and stiffness to the laminate, depending on the application. For example, in some applications, the glass can have a thickness of greater than or equal to about 1 millimeter (mm), or, more specifically, about 1 mm to about 15 mm, or, yet more specifically, about 2 mm to about 12 mm.

The plastic can be any plastic comprising the desired transparency, e.g., thermoplastic(s), thermoset(s), and combinations comprising at least one of the foregoing. For example, a plastic having a transmission of greater than or equal to 50%, or, more specifically, greater than or equal to about 65%, or, even more specifically, greater than or equal to about 80% can be used. As used herein, transparency is determined in accordance with ASTM D1003-00, Procedure A, measured, e.g., using a HAZE-GUARD DUAL from BYK-Gardner, using and integrating sphere (0°/diffuse geometry), wherein the spectral sensitivity conforms to the CIE standard spectral value under standard lamp D65. Possible plastics include polycarbonate, poly(methyl) acrylate, poly(ethylene terephthalate) (PET), polyamide (e.g., transparent polyamide having a transparency of greater than or equal to 50%), olefins, as well as combinations comprising at least one of the foregoing, such as poly(ethylene terephthalate copolymers (APET, PETG), cyclic olefin copolymers, acrylic olefin copolymers, and so forth. In some embodiments, the plastic sheet(s) also comprise color, e.g., pigment(s) and/or dye(s). The colored plastic sheet can have a transmission of greater than or equal to 10%, or, more specifically, greater than or equal to about 20%, or, even more specifically, greater than or equal to about 30%.

In one embodiment, the plastic sheet is formed from a thermoplastic polycarbonate resin, such as LEXAN® resin, commercially available from General Electric Company, Pittsfield, Mass. Thermoplastic polycarbonate resin that can be employed in producing the plastic sheet includes, without limitation, aromatic polycarbonates, copolymers of an aromatic polycarbonate such as polyester carbonate copolymer, blends thereof, and blends thereof with other polymers depending on the end use application. In another embodiment, the thermoplastic polycarbonate resin is an aromatic homo-polycarbonate resin such as the polycarbonate resins described in U.S. Pat. No. 4,351,920 to Ariga et al.

For example, some possible polycarbonates can be prepared by reacting a dihedral phenol with a carbonate precursor, such as phosgene, a haloformate, or a carbonate ester. Generally, such carbonate polymers comprise recurring structural units of the formula

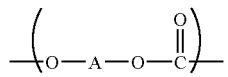

wherein A is a divalent aromatic radical of the dihydric phenol employed in the polymer producing reaction. In one embodiment, the polycarbonate can have an intrinsic viscosity (as measured in methylene chloride at 25° C.) of about 0.30 to about 1.00 deciliter/gram (dL/g). The dihydric phenols employed to provide such polycarbonates can be mononuclear or polynuclear aromatic compounds, containing as functional groups two hydroxy radicals, each of which is attached directly to a carbon atom of an aromatic nucleus. Possible dihydric phenols include, for example, 2,2-bis(4-hydroxyphenyl)propane (bisphenol A), hydroquinone, resorcinol, 2,2-bis(4-hydroxyphenyl)pentane, 2,4'-(dihydroxydiphenyl)methane, bis(2-hydroxyphenyl)methane, bis(4-hydroxyphenyl)methane, bis(4-hydroxy-5-nitrophenyl) methane, 1,1-bis(4-hydroxyphenyl)ethane, 3,3-bis(4-hydroxyphenyl)pentane, 2,2-dihydroxydiphenyl, 2,6-dihydroxynaphthalene, bis(4-hydroxydiphenyl)sulfone, bis (3,5-diethyl-4-hydroxyphenyl)sulfone, 2,2-bis(3,5-dimethyl-4-hydroxyphenyl)propane, 2,4'-dihydroxydiphenyl sulfone, 5'-chloro-2,4'-dihydroxydiphenyl sulfone, bis(4-hydroxyphenyl)diphenyl sulfone, 4,4'-dihydroxydiphenyl ether, 4,4'-dihydroxy-3,3'-dichlorodiphenyl ether, 4,4-dihydroxy-2,5-dihydroxydiphenyl ether, and the like, and mixtures thereof. Other possible dihydric phenols for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

The polycarbonate resins can be manufactured by known processes, such as, for example and as mentioned above, by reacting a dihydric phenol with a carbonate precursor, such as phosgene, a haloformate, or a carbonate ester, in accordance with methods set forth in the above-cited literature and in U.S. Pat. No. 4,123,436 to Holub et al., or by transesterification processes such as are disclosed in U.S. Pat. No. 3,153,008 to Fox, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized combinations of linear polycarbonate and a branched polycarbonate. Moreover, combinations of any of the above materials can be employed to provide the polycarbonate resin.

The polycarbonates can be branched or linear and generally will have a weight average molecular weight of about 10,000 to about 200,000 atomic mass units (AMU), specifically from about 20,000 to about 100,000 AMU as measured by gel permeation chromatography. The polycarbonates of the invention can employ a variety of end groups to improve performance, such as bulky mono phenols, including cumyl phenol.

The specific thickness of the plastic sheet(s) is dependent upon the particular use of the laminate, e.g., the degree of structural integrity that is desired from the plastic sheet(s), as well as the particular composition of each of the plastic sheet(s). In some embodiments, the plastic sheet(s) can have a thickness of about 0.50 millimeter (mm) to about 18 mm or, more specifically, about 0.75 mm to about 15 mm or, even more specifically, about 1.0 mm to about 12 mm.

Between both panels (also referred to as sheets), e.g., near the periphery of the panels (i.e., between a plastic sheet and a glass or plastic sheet) so as to leave a gap between the panels, the laminate comprises an adhesive. Possible adhesives include acrylic tape (e.g., acrylic foam tape). The adhesive tape can be any adhesive having sufficient structural integrity and compatibility with the glass and plastic to inhibit delamination. For example, the adhesive tape can have an adhesive strength of greater than or equal to about 0.1 megapascals (MPa), or, more specifically, greater than or equal to about 0.2 MPa, as determined in accordance with ISO 4587-1979 (Adhesives-Determination of tensile lap shear strength of high strength adhesive bonds) as specified in Example 1. The elongation at break of the adhesive tape can be greater than or equal to about 50%, or, more specifically, greater than or equal to about 80%, or, even more specifically, greater than or equal to about 95%, as measured in accordance with ISO 4587-1979 (Adhesives—Determination of tensile lap shear strength of high strength adhesive bonds).

The adhesive tape is located between, and near the periphery, of the sheets. The adhesive frames an area to receive the liquid filler. This adhesive, which can have a thickness of about 0.5 mm to about 10 mm, or, more specifically, about 1.0 mm to about 5.0 mm. This adhesive can have a width that is less than or equal to about 50% of a total surface area of the sheet (e.g., the sheet to which is it applied), or, more specifically, about 1% to about 40% of the total surface area, and, yet more specifically, about 2% to about 20%. The adhesive can be located in the outer 40% of laminate (measuring from a center of the laminate toward the edge of the laminate), or, more specifically, in the outer 25%, and yet more specifically, in the outer 10%. For example, if the laminate has a width of 1.0 meter (m), the adhesive would be located between the outer edge and 0.4 m from the outer edge, or, more specifically, between the outer edge and 0.25 m from the outer edge, and yet more specifically, between the outer edge and 0.1 m from the outer edge. It is noted that the adhesive can substantially surround the gap (e.g., only leaving a conduit to enable filling of the gap with the liquid interlayer, and a gas vent (e.g., for air to escape during liquid filling)). The filling conduit and gas vents are each a small passage from the periphery of the sheets to the gap (e.g., the adhesive can enclose greater than or equal to about 90% of the gap, or, more specifically, greater than or equal to about 95% of the gap, or, yet more specifically, about 98% of the gap).

Between the laminate sheets is an elastomeric interlayer. The interlayer can be an elastomer formed from a pourable material that has the desired mechanical properties once cured. The filling has a viscosity to avoid air inclusions during pouring into the gap between the laminate sheets (hereinafter referred to as the gap). In some embodiments, the viscosity can be less than or equal to about 1,500 centipoise (cps). The mechanical properties once cured (e.g., stability over a wide temperature range (e.g., about −40° C. to about 200° C.)) enable the desired use of the laminate (e.g., as a window in a vehicle (automobile, truck, plane, train, and so forth)). For example, the storage modulus (G') of the cured filling can be greater than or equal to 10 Pascal (Pa) and can vary by a factor of less than or equal to about 100, or, more specifically, vary by a factor of less than or equal to about 50, or, yet more specifically, vary by a factor of less than or equal to about 10, and yet more specifically, vary by a factor of less than or equal to about 5, across the temperature range of 40° C. to 200° C. For example, the interlayer can be formed from a liquid having a viscosity that does not form bubbles visible to the unaided eye during pouring into the gap, and has a storage modulus that varies by a factor less than or equal to about 200 over a temperature range of 40° C. to 200° C. For example, the interlayer can be formed from a liquid having a viscosity that does not form bubbles during pouring into the gap, and that has a loss modulus that deviates by a factor of less than or equal to about 1,000 (or, more specifically, by a factor of less than or equal to about 500) over a temperature range of 40° C. to 200° C. The interlayer can be formed from a liquid room temperature vulcanize (RTV) filling, such as a silicone filling (e.g., silicone RTV filling).

The laminate can be formed by disposing the adhesive between the glass and plastic (e.g., locating the adhesive on the glass and/or plastic), wherein a fill space is left without adhesive. The fill space is a conduit from the edge of the glass and plastic to the gap that can otherwise be enclosed by the adhesive. The conduit has a sufficient size to allow introduction of the liquid filling into the gap. Optionally, a gas vent(s) can be located along the periphery of the laminate to allow the escape of gas (e.g., air), as the liquid filling is introduced to the gap. The location should be chosen in such a way that the filling will not leak out of the gap before vulcanization is complete.

The liquid filling is prepared at a viscosity that will enable the filling of the gap, with little or no inclusions. In the gap, the liquid cures, forming the laminate. The resultant laminate can be used in numerous applications such as glazing applications, use as a window (e.g., train, building and construction, greenhouse, vehicle), doors (e.g., revolving, sliding), and so forth.

The following examples are merely exemplary, not limiting, and are provided to further explain the laminate and method of making the laminate.

EXAMPLES

Example 1

The adhesion strength of the tape was tested by means of a lab shear strength test according ISO 4587-1979 (Adhesives—Determination of tensile lap shear strength of high strength adhesive bonds). Glass slides and polycarbonate sheets of 25 millimeter (mm) width were used. The lab shear surface of the polycarbonate was treated according the recommendations of the tape supplier, i.e. the polycarbonate surface was abraded using sand paper (SCOTCH-BRITE™ from 3M), subsequently cleaning with isopropyl alcohol and then applying primer 94 from 3M. The tape (VHB tape commercially available from 3M Company) was cut to size, positioned on the polycarbonate side and the glass layer was laminated on top by using manual pressure, the overlap area was 300.8 mm2. The adhesion was tested after 20 minutes of curing time at room temperature. Six specimens were prepared for each VHB tape. Four different types of VHB tape were tested. The bonded assembly was loaded into a Lloyd LR 30 K draw bench equipped with a 10 kiloNewton (kN) load cell. The shear strength of the adhesive was determined by measuring the peak force required to shear the assembly apart at a rate of 10 millimeters per minute (mm/min). The average of 6 samples was reported in Table 1. As can be seen, even at the lowest bonding strength (Sample 3), the failure mode was cohesive (that is, the tape split and was still adhering to both the glass and the polycarbonate).

TABLE 1

| Sample No. | Tape | Max. Load (N) | Deflection at Max. Load (%) | Bonding Strength (MPa) | Failure Mode |
|---|---|---|---|---|---|
| 1 | 4905F | 140.4 | 46 | 0.46 | cohesive |
| 2 | 4910 | 103.3 | 70 | 0.34 | cohesive |
| 3 | 4915F | 73.9 | 87 | 0.25 | cohesive |
| 4 | 4918 | 93.1 | 151 | 0.31 | cohesive |

Example 2

The resins tested were silicone (single component used as a control), silicone RTV, and 2K polyurethane. Both the silicone RTV and 2K polyurethane resins were 2 component resins that were mixed in the ratio recommended by the supplier. The viscosity was measured as a function of time using a Brookfield apparatus according ISO 1652:2004, Rubber Latex—Determination of apparent viscosity by the Brookfield test method. The viscosity was measured on a Brookfield LVTD rheometer equipped with an LV-2 spindle.

The visual inspection of bubble inclusion was done by pouring approximately 10 milliliters (ml) of resin into a glass tube having a diameter of 2 centimeters (cm). The visual inspection is with the unaided eye, wherein the unaided eye excludes the use of optical devices for magnification with the exception of corrective lenses needed for normal eyesight. As can be seen from the testing, once the silicone RTV resin attained viscosity of 1,550 cps, small bubbles were observed, while for the 2K polyurethane, bubbles were observed at 1,372 cps.

TABLE 2

| Sample No. | Adhesive type | Time (min) | Viscosity (cps) | Visual |
|---|---|---|---|---|
| 5 | silicone (Silastic) | 0 | too high to measure | Large bubbles |
| 6 | silicone RTV[1] | 0 | 693 | no bubbles |
| 7 | silicone RTV[1] | 15 | 838 | no bubbles |
| 8 | silicone RTV[1] | 30 | 985/1,040[3] | no bubbles |
| 9 | silicone RTV[1] | 40 | 1,125 | no bubbles |
| 10 | silicone RTV[1] | 45 | 1,550 | small bubbles |
| 11 | polyurethane[2] | 0 | 465 | no bubbles |
| 12 | polyurethane[2] | 15 | 737 | no bubbles |
| 13 | polyurethane[2] | 30 | 1,372 | small bubbles |

[1]2K RTV (RTV 6166 commercially available from Momentive Performance Materials Inc.)
[2]2K polyurethane (MG 709 commercially available from Ebalta kunststoff GmbH)
[3]duplicate measurements Example 3

The mechanical behavior of the laminate can be characterized by dynamic mechanical analysis.

Sample 14 was made from 2K polyurethane (namely MG709), with both components mixed in the ratio recommended by the supplier. The liquid was poured into a mold having the appropriate shape for the test and cured for 24 hours at room temperature. After removing the test bar from the mold, dynamic mechanical analysis was done according ISO 6721-7:2001 at 1 hertz (Hz) and temperature sweep from −40° C. to 200° C. in an ARES DMTA torsion tester from Rheometrics Scientific.

Sample 15 was made from silicone RTV (namely RTV 6166), with both components mixed in the ratio recommended by the supplier. Due to the low stiffness of the cured material, it was impossible to make a test bar to be mounted in the torsion equipment. Therefore plate and plate rheometry was executed on the sample. To do so the bottom plate of the rheometer was fixed with an upstanding sidewall creating a kind of cup, the liquid was poured in. Subsequently, the top plate of the rheometer was lowered to cover the liquid completely. The resin was cured for 24 hours at room temperature, the upstanding sidewall was removed and dynamic mechanical analysis was done according ISO 6721-10:2001 at 1 Hz, 10% strain, and temperature sweep from 40° C. to 200° C. in an ARES DMTA torsion tester from Rheometrics Scientific.

Figure 2:
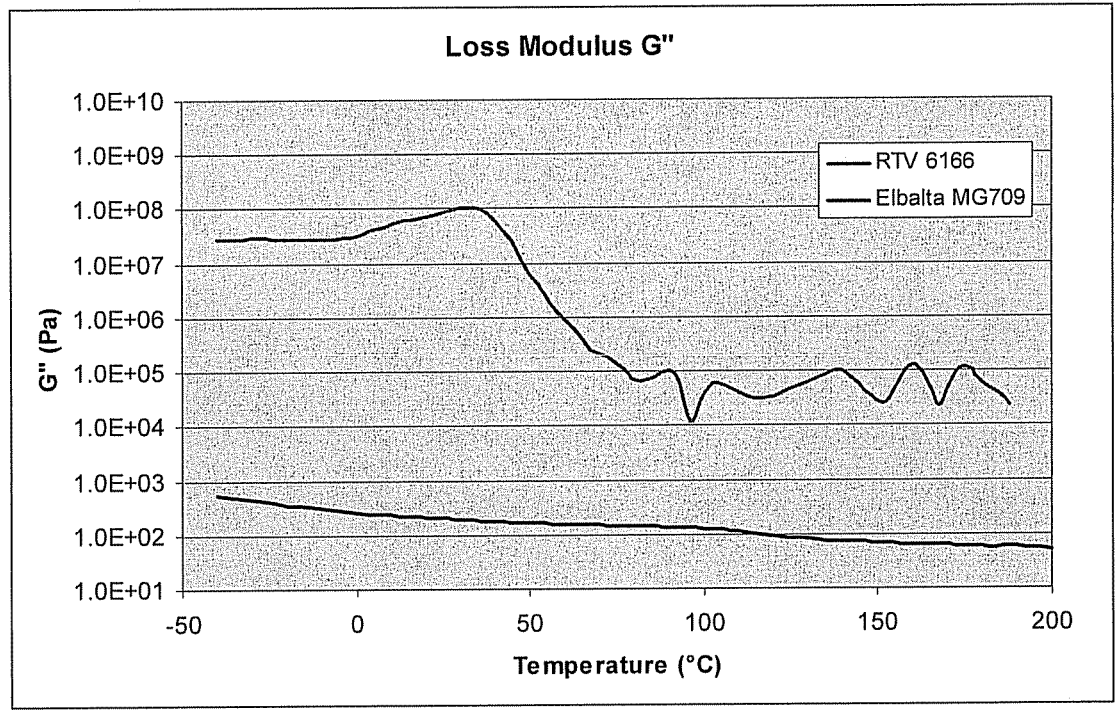
FIG. 2 is a graphical representation of loss modulus, G", versus temperature.
Figure 3:
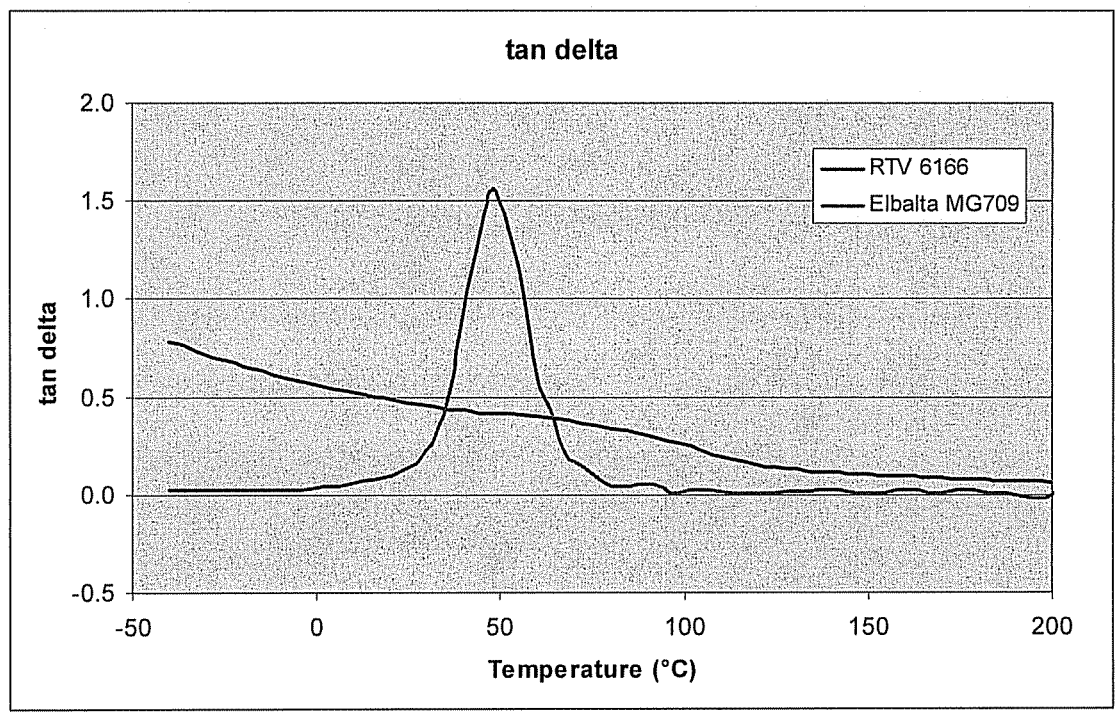
FIG. 3 is a graphical representation of tan delta versus temperature.

FIGS. 1-3 illustrate the results of storage modulus G', loss modulus G", and tan delta, respectively, for Samples 14 and 15. As can be see from FIGS. 1 and 2, the modulus for Sample 15 remained relatively constant, over the temperature range, while the modulus for Sample 14 varied substantially over the temperature range (e.g., a reduction by a factor of over 1,000 for loss modulus, and by a factor of about 1,000 for storage modulus), at 1 Hz and in the temperature range of −40° C. to 200° C. As can be seen, for Sample 15, the storage modulus G' varied at most by a factor of 2.1, at 1 Hz and in the temperature range of −40° C. to 200° C. For the present laminate, the storage modulus G' can be greater than or equal to about 10 Pa (or, more specifically, greater than or equal to about 100 Pa), and can vary by a factor of less than or equal to about 200, or, more specifically, a factor of less than or equal to about 100 and even more specifically, a factor of less than or equal to about 10, and especially, a factor of less than or equal to about 5, at 1 Hz and in the temperature range of −40° C. to 200° C. As can also be seen, for Sample 15, the loss modulus G" changed by a factor of 10.4. For the present laminate, the loss modulus G" can vary by a factor of less than or equal to about 200, or, more specifically, a factor of less than or equal to about 100, and especially, a factor of less than or equal to about 25, at 1 Hz and in the temperature range of −40° C. to 200° C.

Finally, with respect to tan delta, it is desirable that there be a gradual change with a change in temperature (e.g., a gradual decrease with increasing temperature). As can be seen from FIG. 3, for Sample 14, tan delta peaked at around 50° C., while for Sample 15, tan delta gradually decreased as the temperature increased without a marked peak.

Example 4

A rectangular glass pane in the shape of a DIN A4 (e.g., an area of about 210 mm by about 300 mm) with a thickness of about 3 mm was covered on the edges with acrylic foam tape (e.g., VHB Tape, 4915F, commercially available from 3M company). The tape had thicknesses of 1.5 mm and 3 mm, and a width of 12 mm. On one side of the panel two small gaps are left open. One through which the resin can be poured in and the other for de-ventilation. A 6 mm thick polycarbonate sheet (e.g., LEXAN® 9030 DIN A4 sheet, commercially available from GE Plastics, Pittsfield, Mass.) was pretreated as in Example 1, and was positioned on the tape and pressed manually for a few seconds. The tape was cured for 20 minutes at room temperature. Two samples of 1.5 mm gap width were made and three samples of 3 mm gap width were made. One extra sample was made by using an DIN A4 size VHB tape, so as not to leave an air gap.

The components of the 2K polyurethane (MG 709) were mixed for three minutes and poured vertically into the air gap until it was completely filled; two structures were made, one with 1.5 mm spacing (Sample 16), the other with 3.0 mm spacing (Sample 18). Similarly, the components of the silicone RTV (RTV 6166) were mixed for three minutes and poured vertically into the air gap until it was completely filled; two structures were made, one with 1.5 mm spacing (Sample 17), the other with 3.0 mm spacing (Sample 19). One sample with 3.0 mm spacing was left with the gap unfilled (Sample 20). The sample with only VHB tape and no gap was not treated any further (Sample 21). All samples were cured 24 hours before testing.

The samples were submitted to a climate test. The climate test was executed in a Weiss Enet climate chamber, type WK111-340. One cycle was 70° C./95% relative humidity for 12 hours and −20° C./0% relative humidity for 12 hours. A total of seven cycles were performed. The light transmission (LT) was measured before and after the climate test, according to ASTM D1003:00 as set forth above. The test results are set forth in Table 3.

TABLE 3

| Sample No. | Composition between glass and polycarbonate | Gap Width (mm) | LT initial (%) | LT final (%) |
|---|---|---|---|---|
| 16 | MG 709 | 1.5 | 85.1 | glass cracked |
| 17 | RTV 6166 | 1.5 | 85.2 | 85.3 |
| 18 | MG 709 | 3.0 | 85.9 | glass cracked |
| 19 | RTV 6166 | 3.0 | 86.1 | 85.8 |
| 20 | air | 3.0 | 79.8 | — |
| 21 | VHB tape | | 86.5 | — |

As can be seen from Table 3, the samples comprising the silicone RTV did not crack after climate testing, and even substantially retained the light transmission. As can be seen, the light transmission changed from the initial to the final by less than or equal to about 5%, or, more specifically, less than or equal to about 3%, or, even more specifically, less than or equal to about 1%, and, yet more specifically, less than or equal to about 0.5%.

In one embodiment, the present laminate comprises an acrylic tape that acts as a spacer and adhesive between the glass and polycarbonate sheet, and provides flexibility, transparency, and adhesion strength therebetween. In the space (gap) between the glass and the polycarbonate sheet is an extremely flexible interlayer; namely a RTV filling. The RTV filling is transparent and has viscosity properties making it suitable for a pouring resin process and has unique mechanical properties, which makes it very stable in the final application. The combination of these two features results in a bonded glass-polycarbonate laminate which can withstand cyclic climate conditions. The laminate can compensate for the difference in thermal expansion between the glass and polycarbonate. In comparison, glass-polycarbonate laminates with an interlayer of a 2K polyurethane system (two component polyurethane system comprising a diol and di-isocyannate) don't pass the cyclic climate conditions. For example, after climate test exposure (seven cycles where each cycle was: 70° C./95% humidity for 12 hours and −20° C./0% relative humidity for 12 hours), the 2K polyurethane sample exhibited numerous cracks, while the present laminate remained whole, with no visible cracks.

Ranges disclosed herein are inclusive and combinable (e.g., ranges of "up to about 25 wt %, or, more specifically, about 5 wt % to about 20 wt %", is inclusive of the endpoints and all inner values of the ranges of "about 5 wt % to about 25 wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

While the sheeting have been described with reference to exemplary embodiments, it will be understood by those skilled in the art that various changes may be made and equivalents may be substituted for elements thereof without departing from the scope. In addition, many modifications may be made to adapt a particular situation or material to the teachings of the sheeting without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A laminate, comprising:
a plastic sheet having a plastic sheet first surface;
a second sheet having a second sheet second surface, wherein the second sheet comprises plastic or glass;
an adhesive disposed between and in physical contact with the plastic sheet first surface and the second sheet second surface, wherein the adhesive forms a gap between the plastic sheet first surface and the second sheet second surface; and
an interlayer formed from a liquid filling having a viscosity that does not form bubbles visible to the unaided eye when poured into the gap;
wherein, the interlayer is in physical contact with the plastic sheet first surface and the second sheet second surface;
wherein, the interlayer has a storage modulus that varies by a factor of less than or equal to about 200 at 1 Hz in the temperature range of −40° C. to 200° C.

2. The laminate of claim 1, wherein the viscosity is less than or equal to about 1,500 cPs.

3. The laminate of claim 1, wherein, the interlayer further comprises a loss modulus that varies by a factor of less than or equal to about 500.

4. The laminate of claim 1, wherein the liquid filling comprises silicone room temperature vulcanize.

5. The laminate of claim 1, wherein the adhesive comprises an acrylic foam tape.

6. The laminate of claim 1, wherein the interlayer is disposed in the gap between the plastic sheet first surface and the second sheet second surface, and wherein the adhesive substantially surrounds the gap.

7. The laminate of claim 1, wherein the interlayer fills the gap between the plastic sheet first surface and the second sheet second surface.

8. The laminate of claim 1, wherein there are no bubbles visible to the unaided eye in the interlayer.

9. A laminate, comprising:
a plastic sheet having a plastic sheet first surface;
a second sheet having a second sheet second surface, wherein the second sheet comprises plastic or glass;
an adhesive disposed between and in physical contact with the plastic sheet first surface and the second sheet second surface, wherein the adhesive forms a gap between the plastic sheet first surface and the second sheet second surface; and
an elastomer interlayer formed from a liquid room temperature vulcanize filling that is cured;
wherein the elastomer interlayer is located between and in physical contact with the plastic sheet first surface and the second sheet second surface.

10. The laminate of claim 9, wherein the elastomer interlayer further comprises a storage modulus that varies by a factor of less than or equal to about 500 at 1 Hz in the temperature range of −40° C. to 200° C.

11. The laminate of claim 9, wherein the liquid room temperature vulcanize filling comprises silicone room temperature vulcanize.

12. The laminate of claim 9, wherein the adhesive comprises an acrylic foam tape.

13. The laminate of claim 9, wherein the elastomeric interlayer fills the gap.

14. The laminate of claim 9, wherein there are no bubbles visible to the unaided eye in the interlayer.

15. A laminate, comprising:
a thermoplastic sheet having a thermoplastic sheet first surface;
a glass sheet having a glass sheet second surface;
an acrylic foam disposed between and in physical contact with the thermoplastic sheet first surface and the glass sheet second surface, wherein the acrylic foam forms a gap between the thermoplastic sheet first surface and the glass sheet second surface; and
an elastomer interlayer formed from a silicone room temperature vulcanize filling that is cured, wherein the elastomer interlayer is located between and in physical contact with the glass sheet second surface and the thermoplastic sheet first surface.

16. The laminate of claim 15, wherein the acrylic foam is disposed around the elastomeric interlayer.

17. The laminate of claim 15, wherein the elastomeric interlayer fills the gap.

18. A method for making a laminate, comprising:
adhering a glass sheet having a glass sheet second surface to a plastic sheet having a plastic sheet first surface with an adhesive to form a gap between the glass sheet second surface and the plastic sheet first surface; and
introducing a liquid room temperature vulcanize filling to the gap;
wherein, the liquid room temperature vulcanize filling is in physical contact with the plastic sheet first surface and the second sheet second surface.

19. The method of claim 18, wherein the adhesive encloses the gap besides a fill conduit and a vent.

20. The method of claim 18, wherein the adhesive is disposed near the periphery of the glass sheet and the plastic sheet.

21. The method of claim 18, wherein the liquid filling comprises silicone room temperature vulcanize, the adhesive comprises an acrylic foam, and the plastic sheet comprises polycarbonate.

22. The method of claim 18, comprising filling the gap with the liquid room temperature vulcanize filling.

23. A laminate formed by the method of claim 22.

* * * * *